(12) United States Patent  
Baba et al.

(10) Patent No.: US 8,062,016 B2
(45) Date of Patent: Nov. 22, 2011

(54) APPARATUS FOR INJECTION MOLDING (75) Inventors: Hideki Baba, Moka (JP); Koji Akasaka, Moka (JP); Daiju Kawakami, Moka (JP)

(73) Assignee: Moriroku Company, Ltd., Tokyo (JP)

( * ) Notice: Subject to any disclaimer, the term of this patent is extended or adjusted under 35 U.S.C. 154(b) by 373 days.

(21) Appl. No.: 11/463,051

(22) Filed: Aug. 8, 2006

(65) Prior Publication Data

US 2007/0045899 A1 Mar. 1, 2007

(30) Foreign Application Priority Data

Aug. 25, 2005 (JP) .................................. 2005-245096

(51) Int. Cl.
*B29C 45/16* (2006.01)
(52) U.S. Cl. ...................... 425/129.1; 425/112; 425/125; 425/470
(58) Field of Classification Search .................. 264/511, 264/513, 544; 425/112, 129.1, 125, 470
See application file for complete search history.

(56) References Cited

U.S. PATENT DOCUMENTS

| | | | | |
|---|---|---|---|---|
| 4,025,686 A | * | 5/1977 | Zion | 442/373 |
| 4,938,825 A | * | 7/1990 | Macdonald | 156/245 |
| 5,149,479 A | * | 9/1992 | Nakajima | 264/163 |
| 5,401,457 A | * | 3/1995 | Valyi | 264/511 |
| 5,989,480 A | | 11/1999 | Yamazaki | |
| 6,264,461 B1 | * | 7/2001 | Churchwell | 425/572 |
| 7,001,659 B2 | | 2/2006 | Iriyama | |
| 2001/0019761 A1 | * | 9/2001 | Iriyama | 428/200 |
| 2004/0209032 A1 | * | 10/2004 | Wani et al. | 428/57 |

FOREIGN PATENT DOCUMENTS

| | | | |
|---|---|---|---|
| JP | 43-27488 | | 11/1968 |
| JP | 50-19132 | | 7/1975 |
| JP | 54-116057 A | | 9/1979 |
| JP | 63212521 A | * | 9/1988 |
| JP | 8-90587 A | | 4/1996 |
| JP | 8-118409 A | | 5/1996 |
| JP | 2000-153542 A | | 6/2000 |
| JP | 3112147 B2 | * | 11/2000 |
| JP | 2001-219442 | | 8/2001 |
| JP | 2002-36298 A | | 2/2002 |
| JP | 2002-046142 | | 2/2002 |
| JP | 2004-17508 | | 1/2004 |

* cited by examiner

*Primary Examiner* — Joseph S. Del Sole
*Assistant Examiner* — Timothy Kennedy
(74) *Attorney, Agent, or Firm* — Leydig, Voit & Mayer, Ltd.

(57) ABSTRACT

An injection molded article with which a sheet-like material, such as a decorative sheet, is integrated is manufactured without causing damage to the sheet-like material. A molten resin injected into a mold cavity, passes smoothly a peripheral edge of the mold cavity, and flows into a groove portion without accumulating in the vicinity of the peripheral edge. When cooling the molten resin, the temperature of the molten resin in the groove decreases more quickly than the temperature of the molten resin in the mold cavity, because the volume of the groove portion is smaller. As a result, the viscosity of the molten resin in the groove portion and in the vicinity of the peripheral edge of the mold cavity is increased rapidly, preventing a further volume of the molten resin from flowing into the groove portion. The sheet-like material in the vicinity of the peripheral edge is covered by the resinous material of diminished fluidity and protected against exposure to heat and/or pressure of the molten resin.

13 Claims, 8 Drawing Sheets

APPARATUS FOR INJECTION MOLDING

FIELD OF THE INVENTION

The present invention relates to an apparatus and method of injection molding for molding an article of synthetic resin simultaneously with integrating a sheet-like material, such as a decorative sheet, onto a surface of the molded article in a cavity of an injection mold, and more particularly, to an apparatus and method of injection molding for molding an article of synthetic resign and simultaneously unifying a sheet-like material on a surface of the molded article in a cavity of an injection mold without causing damage to the sheet-like material during a molding process.

BACKGROUND OF THE INVENTION

As disclosed in Japanese Patent Public Disclosure No. 2004-017508, Japanese Patent Publication No. S50-19132 and Japanese Patent Publication No. S43-27488, it has been proposed to perform a method of injection molding in order to unify a sheet-like material, such as a decorative or ornamental sheet, on a surface of a molded article during a molding process and add new value or optional function to the molded article due to the properties of the sheet-like material, such as color, pattern, quality of material and the like. A conventional method of injection molding of this kind exemplifies the following steps of: installing a decorative sheet in an injection mold, injecting a molten resin to fill the mold cavity with the molten resin; and solidifying the resin in the cavity to form an injection molded body simultaneously with integrating the decorative sheet onto a surface of the injection molded body.

In this method, the sheet-like material such as a decorative sheet is pre-shaped, as required, by an appropriate forming process such as vacuum forming to be adapted to the shape of the mold cavity while installed in the mold or before installed in the mold. When installed in the mold, the sheet-like material such as a decorative sheet covers the whole or part of the mold cavity, and the area of the mold cavity that is covered with the sheet-like material corresponds to the surface of the injection molded body onto which the sheet-like material should be integrated. At this time, the remaining portion of the sheet-like material which protrudes outside the mold cavity is clamped between the parting surfaces or dividing surfaces or abutting surfaces of the first and second mold sections, for example, a cavity mold and a core mold forming opposite sides of the mold cavity, so that the sheet-like material should not be displaced by injection pressure.

To take a pair of a cavity mold and a core mold as an example, the sheet-like material installed on the cavity mold extends continuously from a mold cavity on to a parting surface of the cavity mold, via the peripheral edge of the mold cavity of the cavity mold. Then the core mold is closed against the cavity mold and the sheet-like material is clamped between the parting surfaces of the core mold and the cavity mold while the sheet-like material extends in the mold cavity. The sheet-like material extending in the mold cavity is defined by the peripheral edge of the mold cavity. When molten resign is injected into the mold cavity from an injection gate of the core mold, the molten resin flows along a surface of the sheet-like material to the peripheral edge of the mold cavity. Thereby, the mold cavity is filled with the molten resign and the sheet-like material defined by the peripheral edge of the mold cavity.

The sheet-like material installed in the mold cavity is affected by the temperature of the molten resin injected into the mold cavity and also affected by the injection pressure of the molten resin produced to fill the mold cavity up with the molten resin. The injected molted resin tends to apply a large pressure to the sheet-like material, in particular, in the vicinity of the peripheral edge of the mold cavity. Depending on conditions of injection molding, the sheet-like material may deform around the peripheral edge of the mold cavity. Especially when the sheet-like material extends along an elongated peripheral edge of the mold cavity, there is an increased risk of serious damage to the sheet-like material because of uneven dispersion of the molten resin. In the event that the sheet-like material is damaged, the molten resin leaks out of the mold cavity from the peripheral edge thereof and produce a flash between the parting surfaces of the mold sections. In addition, the molten resin may penetrate through the sheet-like material and damage the outer surface of an injection molded article to be produced. When the sheet-like material is made of an olefin-based thermoplastic elastomer (TPO) with soft texture or the like, the above-mentioned disadvantages may cause serious damage to an injection molded article.

SUMMARY OF THE INVENTION

An object of the present invention is to provide an apparatus of injection molding for molding an injection molded body and integrating a sheet-like material onto a surface of the injection molded body without causing damage to the sheet-like material.

Another object of the present invention is to provide an apparatus of injection molding for integrating a sheet-like material onto a surface of an injection molded body without causing damage to the sheet-like material.

Further object of the present invention is to provide an apparatus of injection molding for manufacturing an injection molded article integral with a sheet-like material.

Another object of the present invention is to provide a method of injection molding for integrating a sheet-like material onto a surface of an injection molded article during fabrication of the injection molded article.

Further object of the present invention is to provide a method of injection molding for manufacturing an injection molded article onto which a sheet-like material is integrated during fabrication of the injection molded article.

Another object of the present invention is to provide a method of injection molding for molding an injection molded article and integrating a sheet-like material with the injection molded article during fabrication of the injection molded article, without causing damage to the sheet-like material.

According to the first aspect of the present invention, there is provided an apparatus of injection molding comprising: at least a pair of mold sections that can be closed and opened, wherein a sheet-like material can be disposed between said mold sections; a fixing device for fixing said sheet-like material at a set place interposed between said mold sections; at least one mold cavity defined in said mold sections when said mold sections are closed; and an injection gate for injecting a molten resin into said mold cavity; characterized in that a groove or recess portion is formed outside the peripheral edge of said mold cavity, and said groove or recess portion is adapted to receive a molten resin that is injected into said mold cavity and flows into said groove or a recess portion through the peripheral edge of said mold cavity.

According the second aspect of the present invention, there is provided a method of injection molding wherein a molten resin injected into a mold cavity and a sheet-like material supplied in mold sections are integrated in said mold sections, and said molten resin integrated with said sheet-like material is molded by said mold sections, characterized by the steps of: disposing said sheet-like material in said mold sections to expand from the interior of said mold cavity to the exterior of said mold cavity continuously; fixing said sheet-like material to said mold sections; injecting said molten resin into said mold cavity to mold an injection molded body made from the molten resin filled in said mold cavity and mold a protrusion made from the molten resin flowing out of the peripheral edge of said mold cavity, wherein said injection molded body is in close contact with said sheet-like material in the interior of said mold cavity, said protrusion is in close contact with said sheet-like material in the exterior of said mold cavity, and said protrusion has a predetermined thickness; cooling said mold sections and increasing a resin viscosity of said protrusion more rapidly than a resin viscosity of said injection molded body in said mold sections due to the difference of the volume capacities between said protrusion and said injection molded body; and applying a predetermined pressure to said molted resin injected into said mold cavity when the resin viscosity of said protrusion has increased to a predetermined value, and integrate said injection molded body and said protrusion with said sheet-like material in said mold sections.

According to the third aspect of the present invention, there is provided a method of injection molding for manufacturing an injection molded article with which a surface material is integrated, characterized by the steps of: disposing said sheet-like material in said mold sections to expand from the interior of said mold cavity to the exterior of said mold cavity continuously; fixing said sheet-like material to said mold sections; injecting said molten resin into said mold cavity to mold an injection molded body made from the molten resin filled in said mold cavity and mold a protrusion made from the molten resin flowing out of the peripheral edge of said mold cavity, wherein said injection molded body is in close contact with said sheet-like material in the interior of said mold cavity, said protrusion is in close contact with said sheet-like material in the exterior of said mold cavity, and said protrusion has a predetermined thickness; cooling said mold sections and increasing a resin viscosity of said protrusion more rapidly than a resin viscosity of said injection molded body in said mold sections due to the difference of the volume capacities between said protrusion and said injection molded body; applying a predetermined pressure to said molted resin injected into said mold cavity when the resin viscosity of said protrusion has increased to a predetermined value, and integrate said injection molded body and said protrusion with said sheet-like material in said mold sections; and taking said injection molded body out of said mold sections, wherein said injection molded body has been integrated with said sheet-like material and molded into a predetermined shape, and cutting out said protrusion together with the sheet-like material extending outside said mold cavity from said injection molded body.

According to the present invention, one or more groove portions or recess portions are formed on the whole or part of the peripheral edges of the mold cavity in such a manner as to protrude from the mold cavity along the surface of the sheet-like material in the direction in which the sheet-like material extends. Therefore, the molten material which flows into the groove or recess portions from the mold cavity flows smoothly along the sheet-like material at the peripheral edge of the mold cavity. Thereby, it is possible to eliminate a risk where an excessive pressure is applied to the sheet-like material lying at the peripheral edge of the mold cavity. Consequently, the temperature and/or pressure of the molten resin does not cause damage to the sheet-like material lying in the vicinity of the peripheral edge of the mold cavity during molding process.

Due to the difference of the volume capacities between the protrusion and the injection molded body according to the present invention, a resin viscosity of said protrusion increases more rapidly than a resin viscosity of said injection molded body when cooling the mold sections. In other wards, the fluidity of the resinous material in the vicinity of the peripheral edge of the mold cavity is diminished more quickly than the fluidity of the resinous material in the mold cavity by cooling the mold sections. Therefore, the sheet-like material lying in the vicinity of the peripheral edge of the cavity mold comes to be covered by the resinous material of diminished fluidity or increased viscosity so that the sheet-like material is protected against exposure to heat and/or pressure in the vicinity of the peripheral edge of said cavity mold.

In addition, the molten material flows smoothly in the vicinity of the edge portion of the mold cavity when the molten material is being injected, because the molten resin is received by the groove or recess portion at the peripheral edge of the mold cavity. Therefore, the sheet-like material can be prevented from being damaged by the heat and/or pressure of the molten resin accumulated in the vicinity of the peripheral edge of the mold cavity.

These and other objects and advantages of the present invention will be more fully and readily understood by referring to the following detailed description of the present invention and the accompanying drawings.

BRIEF DESCRIPTION OF THE DRAWINGS

FIG. 1 shows exemplarily an apparatus of injection molding according to the present invention, wherein

DETAILED DESCRIPTION OF THE INVENTION

The First Embodiment

For a preferred embodiment of the present invention, one or more shallow grooves are formed on a parting surface of a core mold. The grooves extend from an edge portion of a cavity in the core mold outwards of a mold cavity so that an injected molten material flows into the grooves smoothly and is cooled quickly in the vicinity of an edge portion of the mold cavity. When the injected molten material reached the edge portion of the cavity in the core mold, the molted material flows smoothly without staying on the edge portion of the cavity.

Figure 1A:
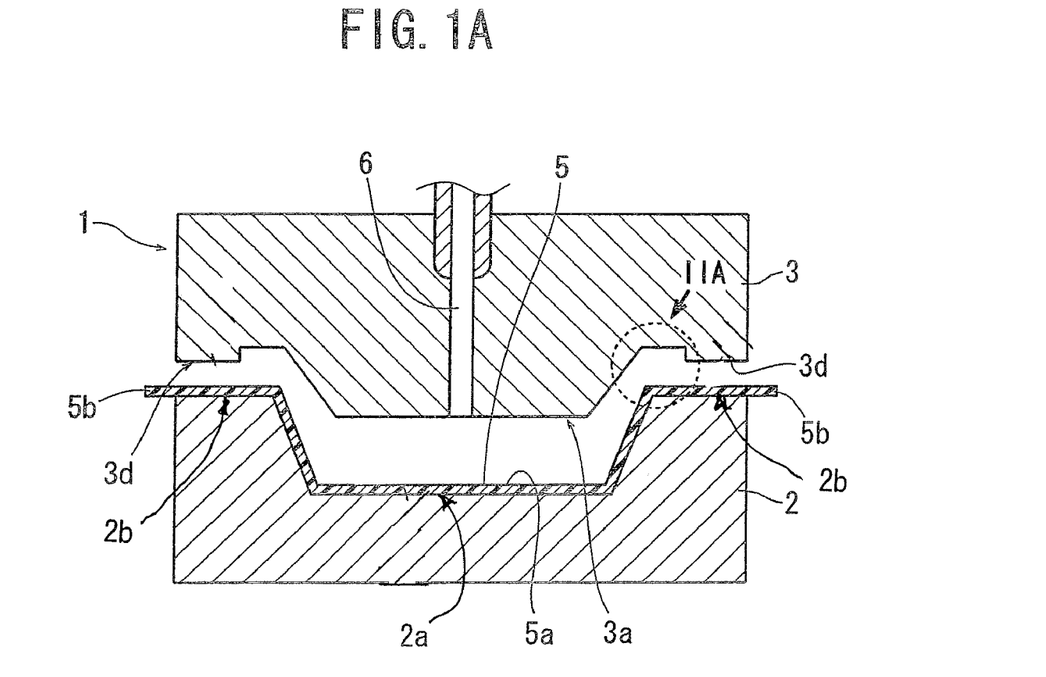
FIG. 1A shows a state in which a mold is opened.
Figure 1B:
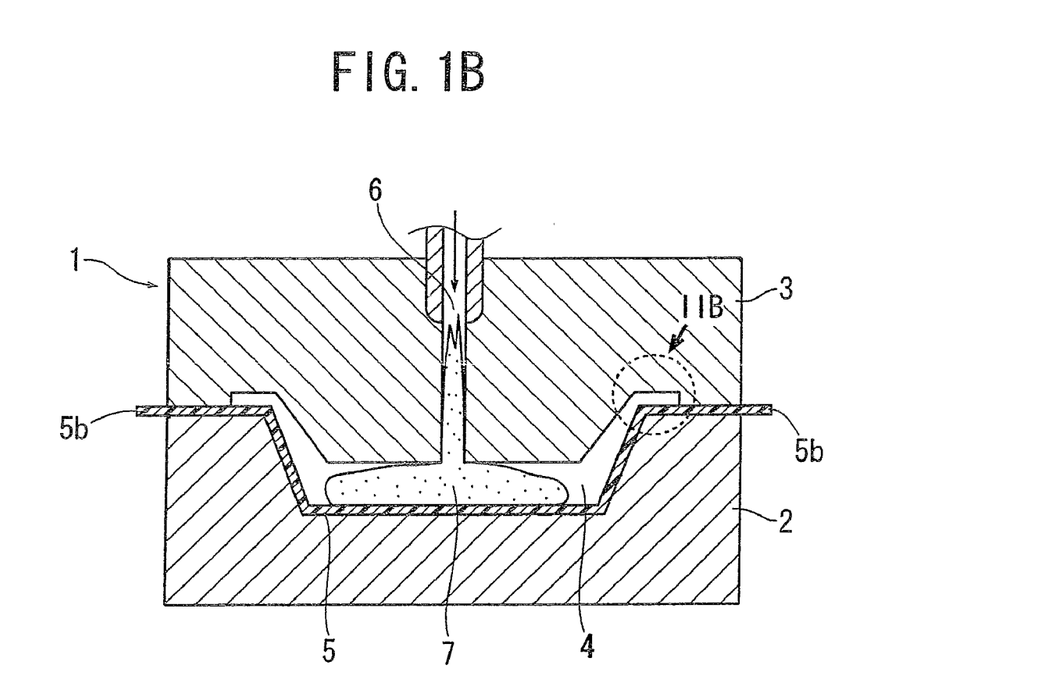
FIG. 1B shows a state in which the mold is closed.

FIGS. 1 and 2 are drawings which show exemplarily an apparatus of injection molding according to the present invention, wherein the mold sections are open in FIG. 1A, while the mold sections are closed in FIG. 1B. An apparatus of injection molding 1 has a cavity mold 2 and a core mold 3 in those figures, and when the core mold 3 are closed against the cavity mold 2 as shown in FIG. 1B, a mold cavity 4 is formed between the cavity mold 2 and the core mold 3.

A sheet-like material 5 such as a decorative sheet for a molded article is formed of an olefin-based thermoplastic elastomer (TPO) or the like so as to provide a surface of the molded article with soft texture. The sheet-like material 5 may be pre-shaped by an apparatus of injection molding 1 using a suitable forming technique such as vacuum forming or the like so as to match a cavity configuration of the cavity mold or may be pre-shaped using any other vacuum forming system than the apparatus 1. As shown in FIG. 1A, the sheet-like material 5, which has been pre-shaped, is placed in the cavity mold 2. The pre-shaped sheet-like material 5 has a formed portion 5a which is closely secured to a cavity surface 2a of the cavity mold 2 and a holding portion 5b which extends along a parting surface 2b of the cavity mold 2.

Figure 2A:
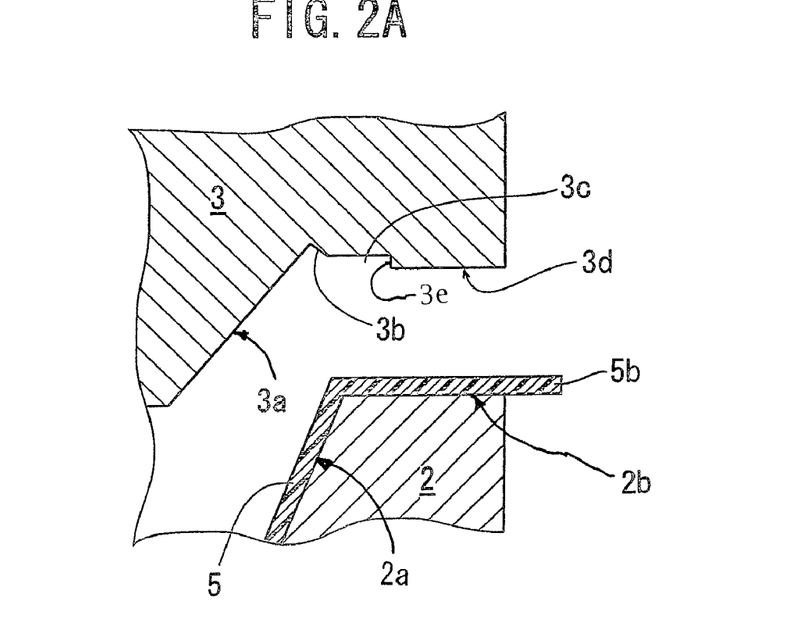
FIG. 2A shows an enlarged sectional view of the area indicated by an arrow IIA in FIG. 1A.

As shown in FIG. 2A, a groove portion 3c extends from an edge portion 3b of a cavity surface 3a of the core mold 3. The groove portion 3c is a single annular groove which has an open side at a parting surface 3d of the core mold 3. The groove portion 3c extends from the edge portion 3b of the cavity surface 3a outwards of the core mold 3 and along the edge portion 3b of the cavity surface 3a to an end wall 3e that is transverse to the parting surface 3d of the core mold 3.

Figure 2B:
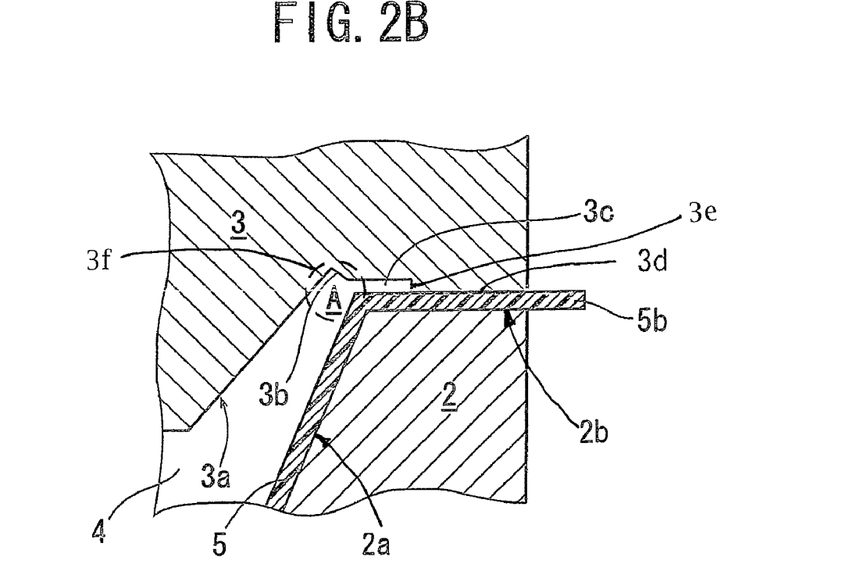
FIG. 2B shows an enlarged sectional view of the area indicated by an arrow IIB in FIG. 1B.

As shown in FIG. 1B, the core mold 3 is closed against the cavity mold 2 to produce the configuration of FIG. 2B and then a molten resin 7 is injected into the mold cavity 4 from an injection gate 6 in the core mold 3. The molten resin 7 injected into the mold cavity 4 flows along an upper surface of the sheet-like material 5 mounted in the cavity mold 2 and reaches the edge portion 3b of the cavity surface 3a. As shown in FIG. 2B, the resin flows through a channel 3f having a cross-section that becomes smaller in the direction of the groove portion 3c. The groove portion 3c is open at the edge portion 3b, but is closed by the end wall 3e. Because of the tapering cross-sectional area of the channel 3f and the closed end of the groove portion 3c, the molten resin 7 flows along the upper surface of the sheet-like material 5 and smoothly into the groove portion 3c without staying on the edge portion 3b. When the mold cavity 4 and the groove portion 3c are filled with the molten resin 7, the molten resin 7 is held under pressure in the mold sections 2 and 3 for a certain period of time. Simultaneously, the mold sections 2 and 3 are cooled by a cooling apparatus (not shown). Due to the cooling process, the molten resin 7 is solidified to form a molded body (not shown) in the mold cavity 4, and the molded body is integrated onto the upper surface of the sheet-like material 5. During the cooling process, the molten resin 7 in the groove portion 3c is hardened sooner than the molten resin 7 in the mold cavity 4 becomes hardened, because the volume of the groove portion 3c is far smaller than the volume of the mold cavity 4. As the viscosity of the molten resin 7 is increased in the groove portion 3c, the fluidity of the molten resin 7 becomes diminished not only in the groove portion 3c but also in the vicinity of the edge portion 3b of the cavity surface 3a or a peripheral edge A of the mold cavity 4.

The diminished fluidity of the molten resin 7 prevents a further volume of the molten resin 7 from flowing into the groove portion 3c from the mold cavity 4 and also prevents the migration of the molten resin 7 in the vicinity of the peripheral edge A of the mold cavity 4. In the vicinity of the peripheral edge A of the mold cavity 4, the sheet-like material 5 comes to be covered by the molten resin 7 of increased viscosity and protected against exposure to heat and/or pressure. Thereby, the molten resin 7 does not leak out between the parting surface 3d and the upper surface of the sheet-like material 5 to form a flash, even in the process that the molten resin 7 is pressurized at a hold pressure in the mold sections 2 and 3. In addition, the sheet-like material lying in the vicinity of the peripheral edge A of the mold cavity 4 is prevented from being deformed or damaged by the pressure and/or heat of the molten resin 7, because of the protective resin coating over the peripheral edge A of the mold cavity 4.

When the cooling process is completed, the mold sections 2 and 3 are separated to open the mold cavity 4 and detach a semi-fabricated article consisting of the sheet-like material S and an injection molded body of the resin 7. The injection molded boy of the resin 7 is integrated onto the upper surface of the sheet-like material 5. The semi-fabricated article includes an extra part of the sheet-like material 5 which extended between the parting surfaces 2b and 3d of the mold sections 2 and 3 when molded. The semi-finished article also includes an extra part of the molded body in the form of an annular flange or the like, which was formed by the groove portion 3c when molded. Therefore, the extra parts of the sheet-like material 5 and the molded body are cut to be removed from the semi-fabricated article to obtain a finished product of the injection molded article.

The Second Embodiment

Figure 3:
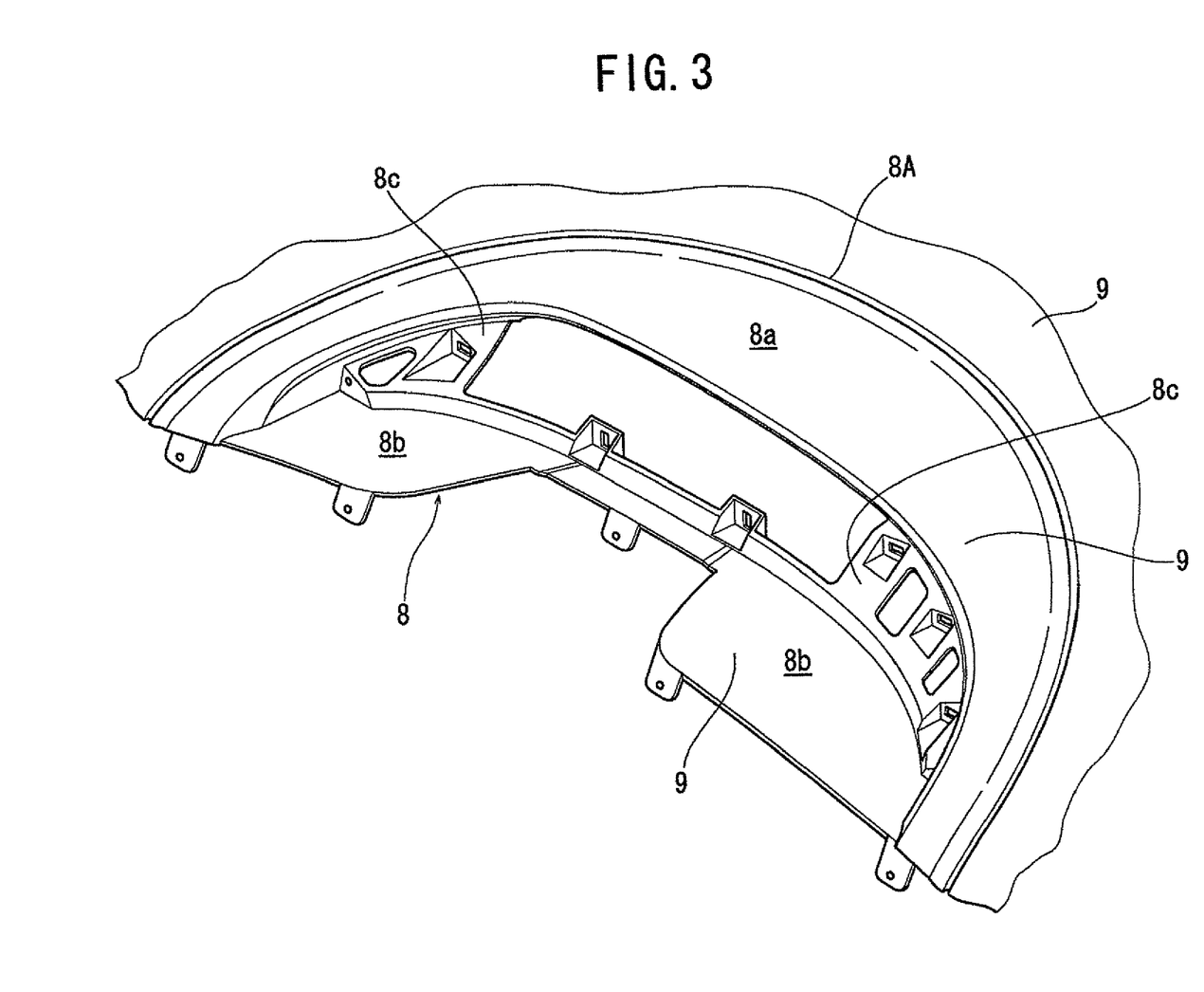
FIG. 3 shows a perspective view of a meter cluster housing for vehicles with which a TPO sheet is integrated.

FIG. 3 illustrates a perspective view an automotive interior part, that is, a meter cluster housing 8. As a decorative sheet, a TPO sheet 9 having a soft texture is integrated onto a surface of the housing 8. Hereinafter, the present invention will be described further by taking as an example a manufacture of the meter cluster housing 8 with which the TPO sheet 9 is integrated. The flange-like protrusion that is made from the molten resin 7 filled in the groove portion 3c in FIG. 2B is formed along a front edge portion 8A of the meter cluster housing 8 and is positioned on a back side of the TPO sheet 9 extending toward the outside of the front edge portion 8A.

Figure 4:
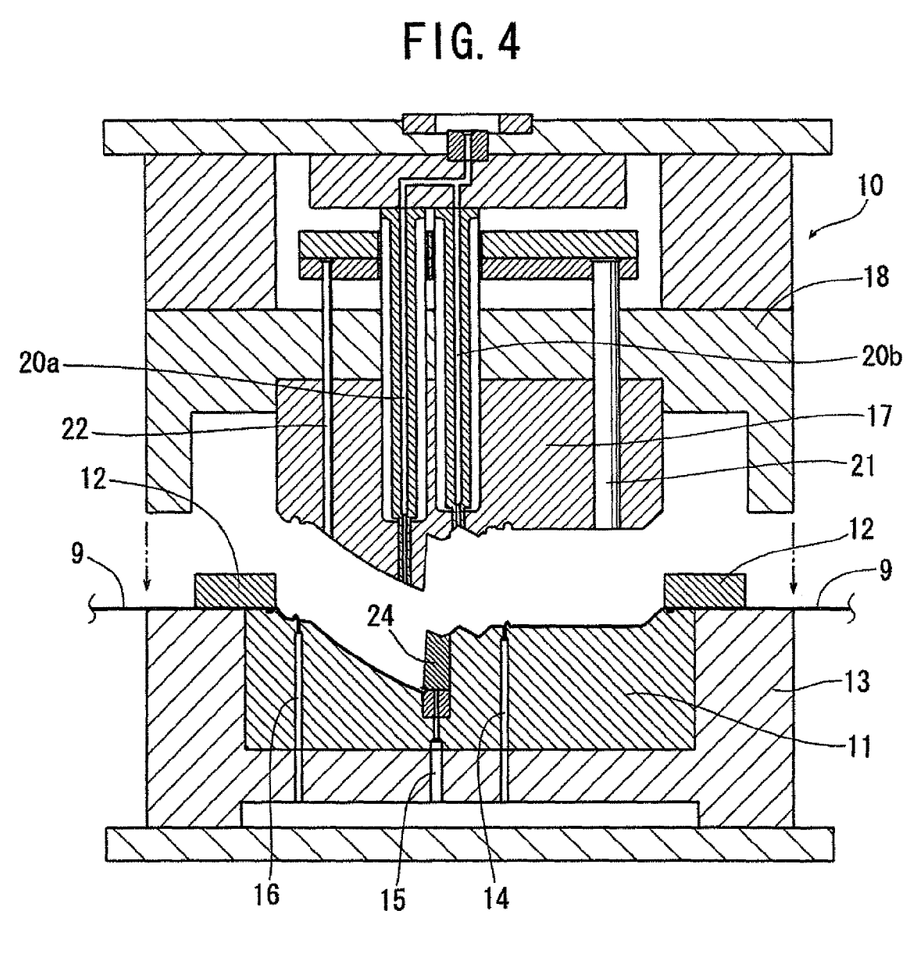
FIG. 4 shows a vertical sectional view of an apparatus of injection molding for manufacturing the interior component for vehicles shown in FIG. 3, with a cavity mold and a core mold separated from each other to open the cavity mold.

In FIG. 4, the TPO sheet 9 is heated by a heating device (not shown) so as to be softened and fixed to a parting surface of a cavity mold 11 of an apparatus of injection molding 10 by means of dampers 12, 12. In this example, the cavity mold 11 is a stationary mold held by a base member 13 and a plurality of suction ports 14, 15, 16 are formed in the cavity mold 11 and the base member 13. The TPO sheet 9 supplied on the cavity mold 11 is sucked by virtue of vacuum created in air suction ports 14, 15, 16 so as to be closely secured to a mold surface of the cavity mold 11 by means of vacuum forming. Thereby, the TPO sheet 9 is pre-shaped to conform with the mold surface of the cavity mold 11, which corresponds to a surface configuration of a meter cluster housing 8 to be molded.

Figure 5:
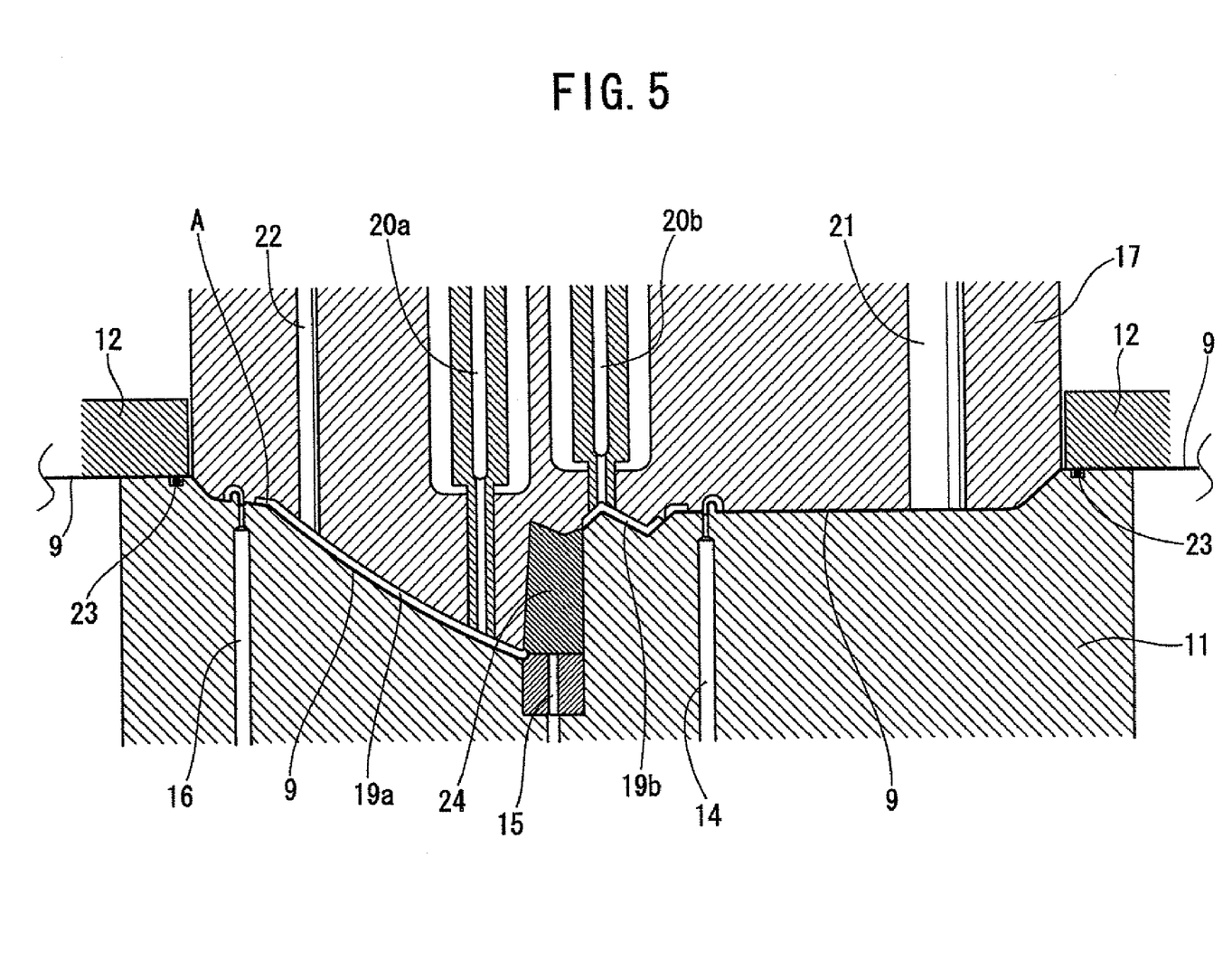
FIG. 5 shows a sectional view of a main part of the cavity mold and the core mold in FIG. 4, which are brought into mating engagement to close the mold cavity.

A core mold 17 disposed above the cavity mold 11 is held by an upper flame 18 as a movable mold of the apparatus of injection molding 10. In the core mold 17, a pair of injection gates 20a, 20b and a pair of ejector rods or ejector pins 21, 22 are installed in order to remove a molded article from the mold sections 11, 17. When the pre-shaping of the TPO sheet 9 is completed, the core mold 17 is lowered together with the upper frame 18 and the core mold 17 is closed against the cavity mold 11 to define a mold cavities 19*a*, 19*b* between the core mold 17 and the cavity mold 11 as illustrated in FIG. 5. Then, a molten resin is injected into the mold cavity 19*a* from a injection gate 20*a* to form a visor portion 8*a* of the meter cluster housing 8 and simultaneously, a molten resin is injected into the mold cavity 19*b* from an injection gate 20*b* to form a shelf portions 8*b*, 8*b* of the meter cluster housing 8. Since the mold cavities 19*a*, 19*b* communicate with each other via one or more communicating paths (not shown) formed between the mold cavities 19*a*, 19*b*, the molted resin flowed into the communicating paths forms a mounting portion 8*c* on which various instruments such as meters are mounted. In those figures, reference numeral 23 denotes a seal member for sealing a gap between the TPO sheet 9 and the parting surface of the cavity mold 11 in cooperation with the dampers 12. Reference numeral 24 denotes a detachable piece which makes up part of the cavity mold 11 to be replaced when it gets worn.

Figure 6:
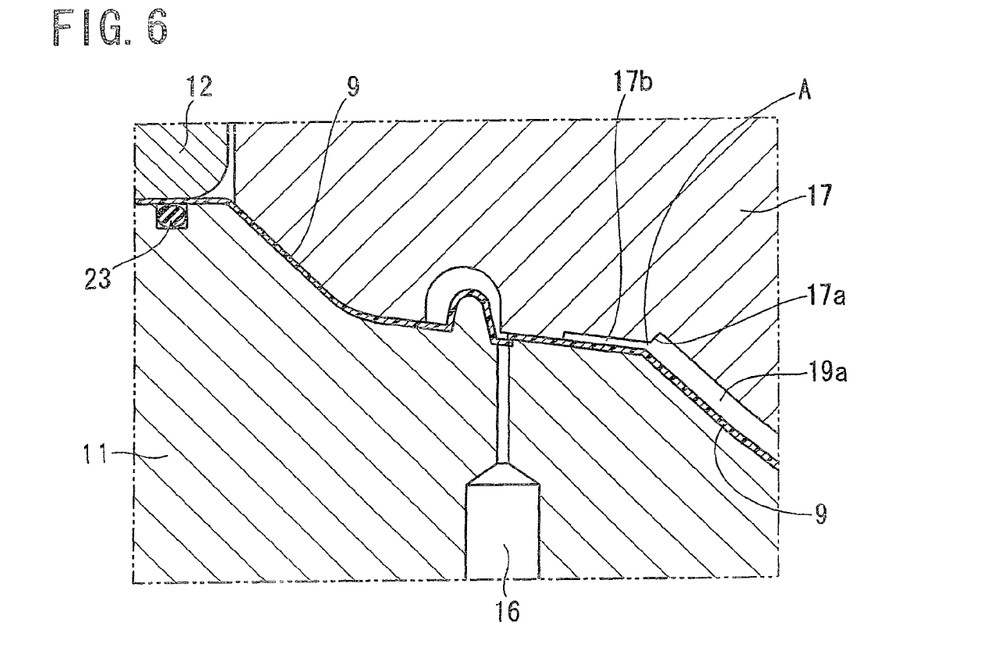
FIG. 6 shows as shown in FIG. 5.
Figure 7:
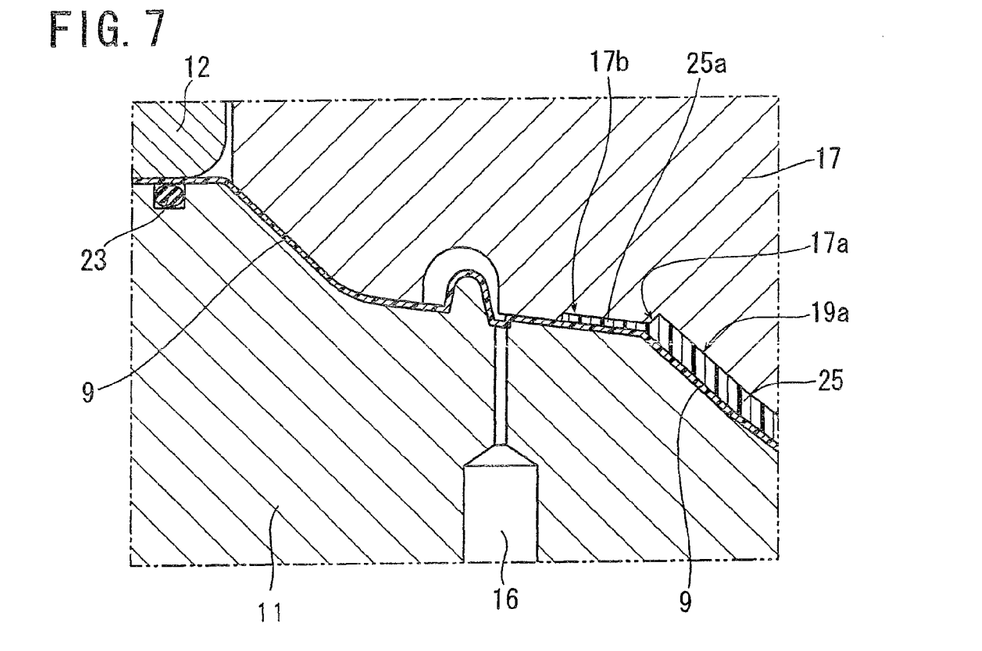
FIG. 7 shows the vicinity of the peripheral edge of the mold cavity wherein a molten resin is injected into the mold cavity shown in FIG. 6.
Figure 8:
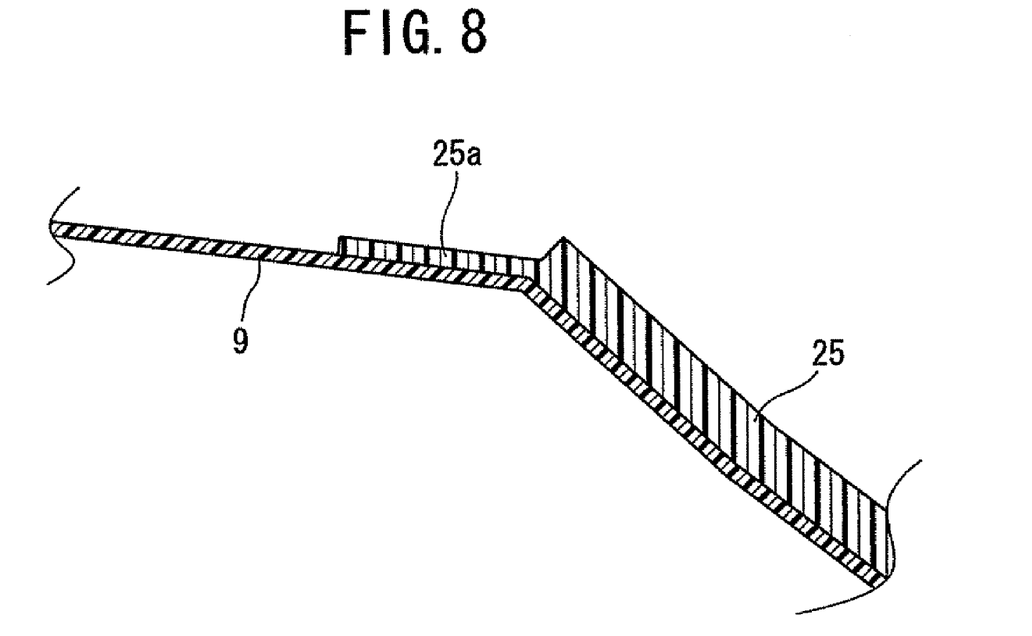
FIG. 8 shows an enlarged sectional view of an edge portion of an injection molded article which is taken out of the mold sections shown in FIG. 6.

As illustrated in FIG. 6, a groove portion 17*b* is formed on the parting surface of the core mold 17. The groove portion 17*b* is in the form of an elongated step extending along the edge portion 17*a* of the cavity surface in the core mold 17. The edge portion 17*a* corresponds to a peripheral edge A of the mold cavity 19*a* as shown in FIG. 6. The groove portion 17*b* is made up of a single groove that extends to curve along an outer side of the peripheral edge A of the mold cavity 19*a* as to form a thin protrusion 25*a* of a molded body 25 as illustrated in FIG. 8. The thin protrusion 25*a* is in the form of a flap that is made from a molten resin injected into the mold cavity 19*a* and integrated onto an upper surface of the TPO sheet 9 as shown in FIGS. 7 and 8. The thin protrusion 25*a* is made of resin flowing into the groove portion 17*b* from the mold cavity 19*a* as illustrated in FIG. 7.

Figure 10:
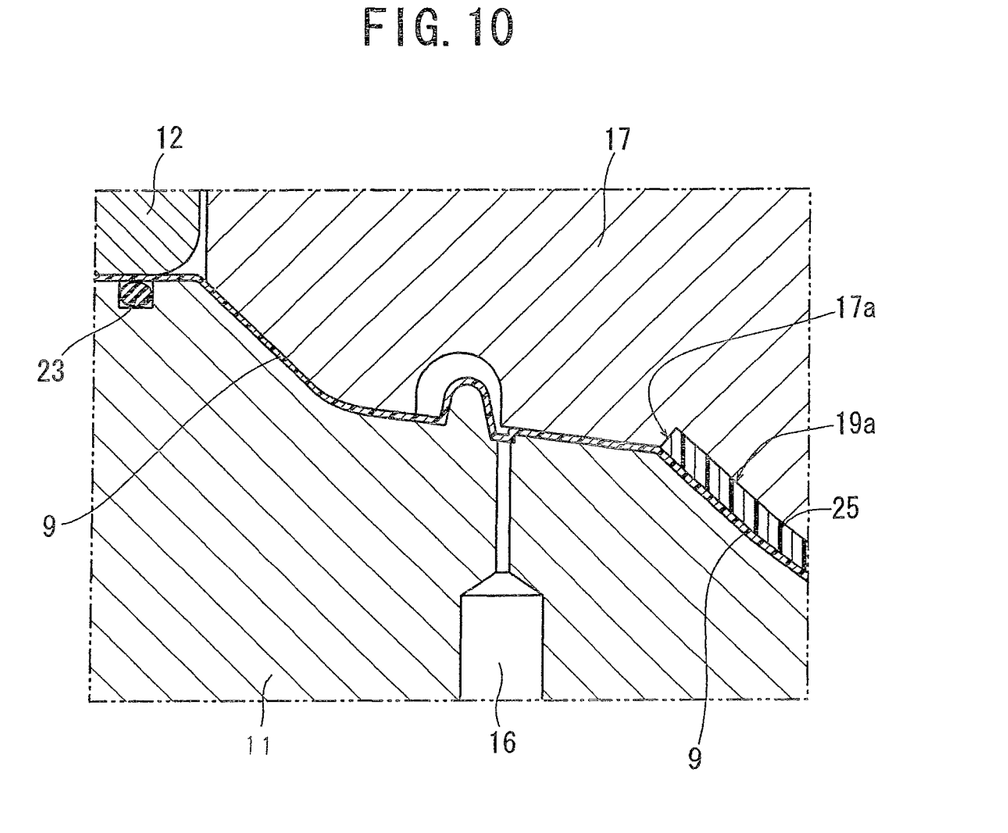
FIG. 10 shows an enlarged sectional view of the vicinity of a peripheral edge in a conventional mold cavity.

FIG. 10 shows, on the contrary, a vertical section of the mold sections 17, 11 that has no groove 17*b* in the peripheral edge A of the mold cavity 19*a*. Comparing FIG. 10 to FIG. 7, it is apparent where the thin protrusion 25*a* is formed.

Now, the molten resin 25 is injected from the injection gates 20*a*, 20*b* into the mold cavities 19*a*, 19*b* after the core mold 17 is closed against the cavity mold 11. The molten resin injected into the mold cavity 19*a* flows along the upper surface of the TPO sheet 9 towards the peripheral edge A of the mold cavity 19*a* while filling the mold cavity 19*a*. As the molten resin reaches the peripheral edge A of the mold cavity 19*a*, the molten resin passes smoothly the peripheral edge A of the mold cavity 19*a* and flows into the groove portion 17*b* without staying in the vicinity of the peripheral edge A of the mold cavity 19*a* or the edge portion 17*a* of the cavity surface of the core mold 17. When the mold cavities 19*a*, 19*b* and the groove portion 17*b* as well as the communicating paths between the mold cavities 19*a*, 19*b* are filled with the molten resin, the injected molten resin is held under pressure in the mold sections 17, 11 for a certain period of time and is cooled down by a cooling device (not shown).

When cooling down the molten resin in the mold sections 17, 11, the temperature of the molten resin filling the groove portion 17*b* decreases more quickly than the temperature of the molten resin within the mold cavities 19*a*, 19*b* because the volume capacity of the groove portion 17*c* is smaller than the volume capacity of the mold cavities 19*a*, 19*b* in the mold sections 17, 11. As a result, the viscosity of the molten resin is increased in the groove portion 17*c*, and the fluidity of the molten resin becomes diminished not only in the groove portion 17*c* but also in the vicinity of the peripheral edge A of the mold cavity 19*a*. The diminished fluidity of the molten resin prevents a further volume of the molten resin from flowing into the groove portion 17*b* from the mold cavity 19*a* and also prevents the migration of the molten resin in the vicinity of the peripheral edge A of the mold cavity 19*a*. In the vicinity of the peripheral edge A of the mold cavity 19*a*, thereby, the TPO sheet 9 comes to be covered by the molten resin of increased viscosity and protected against exposure to heat and/or pressure of the molten resin in the mold cavity 19*a*. As a result, the TPO sheet 9 lying in the vicinity of the peripheral edge A of the mold cavity 19*a* is prevented from being deformed or damaged by the pressure and/or heat of the molten resin. Therefore, the molten resin injected into the mold cavities 19*a*, 19*b* does not leak from between the parting surface of the core mold 17 and the upper surface of the TOP sheet 9 to form a flash, even in the event that a molding pressure is applied further to the molten resin within the mold cavities 19*a*, 19*b* in the subsequent pressure holding step.

Figure 9:
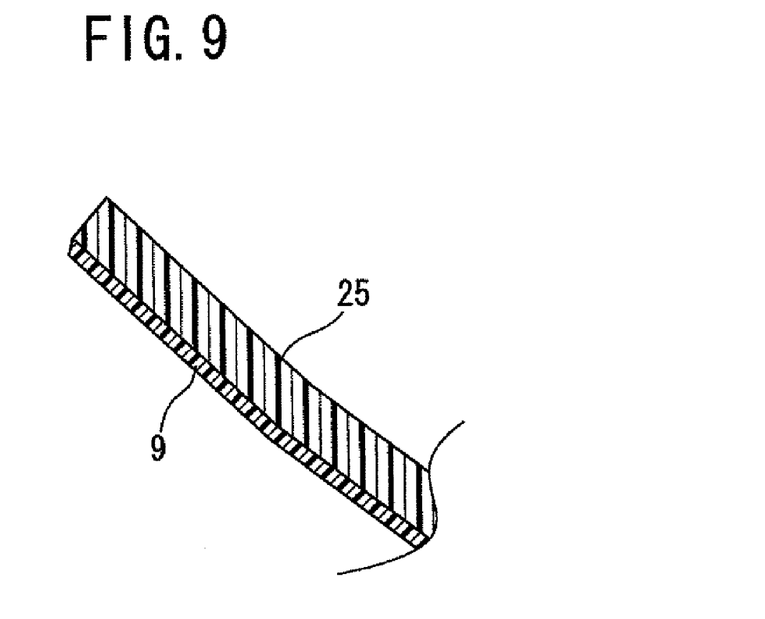
FIG. 9 shows an enlarged sectional view of an edge portion of an injection molded article after an unnecessary portion is trimmed off from the injection molded article shown in FIG. 8.

When the cooling down of the molten resin in the mold sections 17, 11 is completed, a molded body 25 is molded in the mold cavities 19*a*, 19*b* and the communicating paths (not shown) and integrated onto the upper surface of the TPO sheet 9 as illustrated in FIGS. 7 and 8. Simultaneously, the thin protrusion 25*a* of resin is molded in the groove portion 17*b* and integrated onto the upper surface of the TPO sheet 9. The thin protrusion 25*a* extends from the edge of the molded body 25 as shown in FIG. 8. Then, the core mold 17 is lifted from the cavity mold 11 to open the mold cavities 19*a*, 19*b* and the molded body 25 is removed from the mold sections 17, 11 together with the TPO sheet 9 by means of the ejector rods 21, 22. The molded article taken out of the mold sections 17, 11 is a semi-fabricated article of a meter cluster housing 8, because it includes an extra part of the TPO sheet 9 extending from the molded body 25 and the thin protrusion 25*a* integrated onto the extra part of the TPO sheet 9 as shown in FIG. 8. Therefore, the semi-fabricated article is processed in a trimming operation by which the extra part of the TPO sheet 9 and the thin protrusion 25*a* is trimmed off, as shown in FIG. 9, to obtain a finished product of the meter cluster housing 8.

What is claimed is:

1. An apparatus for injection molding comprising:
 a cavity mold and a core mold that can be closed for injection molding and opened to remove a product of injection molding including an article comprising a sheet material and an injection molded body that is on an upper surface of the sheet material, wherein
 said cavity mold and said core mold include respective cavity surfaces and parting surfaces,
 said cavity surfaces define a molding cavity between said cavity mold and said core mold when said cavity mold and said core mold are closed,
 the molding cavity extends to a peripheral part at a peripheral edge of the molding cavity when said cavity mold and said core mold are closed,
 said cavity surface of said cavity mold adjoins said parting surface of said cavity mold at said peripheral edge of the molding cavity so that the sheet material includes a formed portion, which contacts and conforms to said cavity surface of said cavity mold, and a holding portion, which contacts, conforms to, and extends along said parting surface of said cavity mold, when the sheet material is located in the molding cavity, and
 said cavity surface of said core mold includes an edge surface that is located at said peripheral edge of the molding cavity and that is oblique to the upper surface of the sheet material on said parting surface of said cavity mold when said cavity mold and said core mold are closed;

a fixing device for fixing the sheet material at a fixed location, interposed between said cavity mold and said core mold, when the sheet material is located in the molding cavity and said cavity mold and said core mold are closed;

a groove or recess extending beyond and from said peripheral edge of the molding cavity, in said core mold, extending laterally with respect to said peripheral edge of the molding cavity to an end wall of said core mold, the end wall of said core mold being transverse to said parting surface of said core mold, wherein said groove or recess opens to the molding cavity at said peripheral edge of the molding cavity and extends along said parting surface of said cavity molder to said end wall of said core mold, said groove or recess, said end wall, and the upper surface of the sheet material at the holding portion define, when the sheet material is located in the molding cavity and said cavity mold and said core mold are closed, a closed-end groove or recess, and said edge surface of said cavity surface of said core mold and the upper surface of the sheet material define, when the sheet material is located in the molding cavity and said cavity mold and said core mold are closed, a channel located within the molding cavity, at said peripheral edge of the molding cavity, the channel becoming smaller in cross-section towards said closed-end groove or recess for introducing molten resin from the molding cavity into said closed-end groove or recess; and an injection gate for injecting molten resin into the molding cavity, said gate opening into the molding cavity at a location remote from said channel and from said closed-end groove or recess so that the molten resin injected into the molding cavity flows along the upper surface of the sheet material to reach said edge of said cavity surface of said core mold and enter the closed-end groove or recess without accumulating at said peripheral edge of the molding cavity.

2. The apparatus for injection molding as set forth in claim 1, wherein said closed-end groove or recess extends along at least some of said peripheral edge of the molding cavity.

3. The apparatus for injection molding as set forth in claim 1, wherein said cavity mold is fixed and said core mold reciprocates relative to said cavity mold.

4. The apparatus for injection molding as set forth in claim 3, wherein said fixing device comprises at least one clamp for fixing the sheet material to said parting surface of said cavity mold.

5. The apparatus for injection molding as set forth in claim 4, wherein
said closed-end groove or recess is located adjacent said parting surface of said core mold,
said closed-end groove or recess receives the molten resin injected into the molding cavity, and
the molten resin flows into said closed-end groove or recess through the channel onto the upper surface of the sheet material that is located within said closed-end groove or recess.

6. The apparatus for injection molding as set forth in claim 3, wherein
said cavity mold comprises at least one air suction hole for vacuum molding, and
said air suction holes have openings in said cavity surface and/or parting surface of one of said cavity mold and said core mold.

7. The apparatus for injection molding as set forth in claim 6, wherein said fixing device comprises at least one clamp for fixing the sheet material to said parting surface of said cavity mold, and includes sealing means disposed in said parting surface of said cavity mold for sealing the sheet material against said parting surface, in cooperation with said clamp.

8. The apparatus for injection molding as set forth in claim 3, wherein said core mold comprises at least one injection gate for injecting the molten resin into the molding cavity.

9. The apparatus for injection molding as set forth in claim 1, wherein said channel is further defined by the upper surface of the sheet material secured to said cavity surface of said cavity mold and said edge surface of said cavity surface of said core mold forms a peripheral surface that is inclined with respect to the sheet material so that the cross-section of the channel becomes smaller towards said closed-end groove or recess.

10. The apparatus for injection molding as set forth in claim 9, wherein said closed-end groove or recess extends along at least some of said peripheral edge of the molding cavity.

11. The apparatus for injection molding as set forth in claim 1, wherein
said closed-end groove or recess is located adjacent said parting surface of said core mold,
said closed-end groove or recess receives the molten resin injected into the molding cavity, and
the molten resin flows into said closed-end groove or recess through the channel onto the upper surface of the sheet material that is located within said closed-end groove or recess.

12. The apparatus for injection molding as set forth in claim 2, wherein
said closed-end groove or recess is located adjacent said parting surface of said core mold,
said closed-end groove or recess receives the molten resin injected into the molding cavity, and
the molten resin flows into said closed-end groove or recess through the channel onto the upper surface of the sheet material that is located within said closed-end groove or recess.

13. The apparatus for injection molding as set forth in claim 3, wherein
said closed-end groove or recess is located adjacent said parting surface of said core mold,
said closed-end groove or recess receives the molten resin injected into the molding cavity, and
the molten resin flows into said closed-end groove or recess through the channel onto the upper surface of the sheet material that is located within said closed-end groove or recess.

* * * * *